United States Patent
Kanazawa

(10) Patent No.: US 12,542,160 B2
(45) Date of Patent: Feb. 3, 2026

(54) SYNCING VIDEO WITH AUDIO

(71) Applicant: Google LLC, Mountain View, CA (US)

(72) Inventor: Noritsugu Kanazawa, Campbell, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/629,404

(22) Filed: Apr. 8, 2024

(65) Prior Publication Data

US 2025/0316293 A1    Oct. 9, 2025

(51) Int. Cl.
*G11B 27/10* (2006.01)
*G06T 11/60* (2006.01)

(52) U.S. Cl.
CPC .............. *G11B 27/10* (2013.01); *G06T 11/60* (2013.01); *G06T 2211/441* (2023.08)

(58) Field of Classification Search
None
See application file for complete search history.

(56) References Cited

U.S. PATENT DOCUMENTS

| 2014/0210831 A1* | 7/2014 | Stenger | G06T 13/40 |
| | | | 345/474 |
| 2016/0156575 A1* | 6/2016 | Jeong | H04L 51/10 |
| | | | 709/206 |
| 2022/0036617 A1* | 2/2022 | Biswas | G06T 13/40 |
| 2023/0215068 A1* | 7/2023 | Sima | G10L 15/22 |
| | | | 345/474 |

OTHER PUBLICATIONS

"AI-powered video creation at scale", HeyGen, Retrieved from: https://www.heygen.com/, Accessed on: Jan. 7, 2024, 11 pp.
"NVIDIA Audio2Face", NVIDIA, Retrieved from: https://www.nvidia.com/en-us/ai-data-science/audio2face/, Accessed on: Jan. 7, 2024, 10 pp.
"Rudrabha / Wav2Lip", github.com, Retrieved from: https://github.com/Rudrabha/Wav2Lip, Accessed on: Jan. 7, 2024, 5 pp.
Chang et al., "MaskGIT: Masked Generative Image Transformer", arXiv:2202.04200v1, Feb. 8, 2022, 23 pp.
Prajwal et al., "A Lip Sync Expert Is All You Need for Speech to Lip Generation In The Wild", arXiv:2008.10010v1, Aug. 23, 2020, 10 pp.
Van Den Oord et al., "Neural Discrete Representation Learning", arXiv: 1711.00937v2, May 30, 2018, 11 pp.

* cited by examiner

*Primary Examiner* — Hung Q Dang
(74) *Attorney, Agent, or Firm* — Shumaker & Sieffert, P.A.

(57) ABSTRACT

Techniques described herein relate to a computing system that includes at least one processor and a storage device that stores instructions executable by the at least one processor to generate an encoding vector by providing an audio waveform to an encoder module. The instructions executable by the at least one processor may further cause the at least one processor to determine, based on the encoding vector, an embedding vector of a plurality of embedding vectors of a codebook. The instructions executable by the at least one processor may further cause the at least one processor to provide the embedding vector to a decoder module. The instructions executable by the at least one processor may further cause the at least one processor to output, based on the embedding vector, an expression with the decoder module, wherein the expression includes a series of one or more lip geometries.

20 Claims, 7 Drawing Sheets

SYNCING VIDEO WITH AUDIO

BACKGROUND

Audio-visual media may be translated or dubbed in a language different than the language characters in the media piece are speaking. Dubbed audio-visual media includes audio that does not match lip geometries of characters speaking in video of the dubbed audio-visual media.

SUMMARY

In general, techniques of the present disclosure sync video with audio of audio-visual media. The techniques described herein include a computing system with an autoencoder machine learning system that may accurately determine expressions (e.g., a series of lip geometries) provided an audio waveform. The computing system may alter video of audio-visual media with expressions output by the autoencoder machine learning system to sync the video with audio of the audio-visual media. The autoencoder machine learning system may be trained to output an expression when provided with an audio waveform based on latent space mappings of discrete expressions learned by the autoencoder machine learning system. The autoencoder machine learning system may predict an expression based on an audio waveform. The autoencoder machine learning system may select a discrete expression encoded in the latent space mappings based on a mapping of the predicted expression in the latent space mappings. The autoencoder machine learning system may decode selected expressions encoded in the latent space mapping to output an expression corresponding to the input audio waveform.

In some instances, the autoencoder machine learning system may be trained with reference facial identities (e.g., facial characteristics) to more accurately predict an expression based on input audio. In other words, the autoencoder machine learning system may be trained with reference facial identities to improve predicted expressions mapped in the latent space mappings. The autoencoder machine learning system may be trained to scale, based on parameters of the autoencoder machine learning system, the number of mapped expressions and/or facial identities to generate different magnitudes of expressions and/or facial identities (e.g., different magnitudes of smiley expressions or different magnitudes of mouth curvature facial characteristics). In some examples, the autoencoder machine learning system may output expressions to a generative model to reconstruct original video of dubbed audio-visual media to include the expressions output by the autoencoder machine learning system.

In some aspects, the techniques described herein relate to a method that includes generating, by a computing system, an encoding vector by providing an audio waveform to an encoder module. The method may further include determining, by the computing system and based on the encoding vector, an embedding vector of a plurality of embedding vectors of a codebook. The method may further include providing, by the computing system, the embedding vector to a decoder module. The method may further include outputting, by the computing system and based on the embedding vector, an expression with the decoder module, wherein the expression includes a series of one or more lip geometries.

In some aspects, the techniques described herein relate to a computing system that includes at least one processor and a storage device that stores instructions executable by the at least one processor to generate an encoding vector by providing an audio waveform to an encoder module of. The instructions executable by the at least one processor may further cause the at least one processor to determine, based on the encoding vector, an embedding vector of a plurality of embedding vectors of a codebook. The instructions executable by the at least one processor may further cause the at least one processor to provide the embedding vector to a decoder module. The instructions executable by the at least one processor may further cause the at least one processor to output, based on the embedding vector, an expression with the decoder module, wherein the expression includes a series of one or more lip geometries.

In some aspects, the techniques described herein relate to non-transitory computer-readable storage medium configured to store instructions that, when executed, cause one or more processors of a computing system to generate an encoding vector by providing an audio waveform to an encoder module. The instructions may further cause the one or more processors to determine, based on the encoding vector, an embedding vector of a plurality of embedding vectors of a codebook. The instructions may further cause the one or more processors to provide the embedding vector to a decoder module. The instructions may further cause the one or more processors to output, based on the embedding vector, an expression with the decoder module, wherein the expression includes a series of one or more lip geometries.

The details of one or more examples are set forth in the accompanying drawings and the description below. Other features, objects, and advantages of the disclosure will be apparent from the description and drawings, and from the claims.

DETAILED DESCRIPTION

Figure 1:
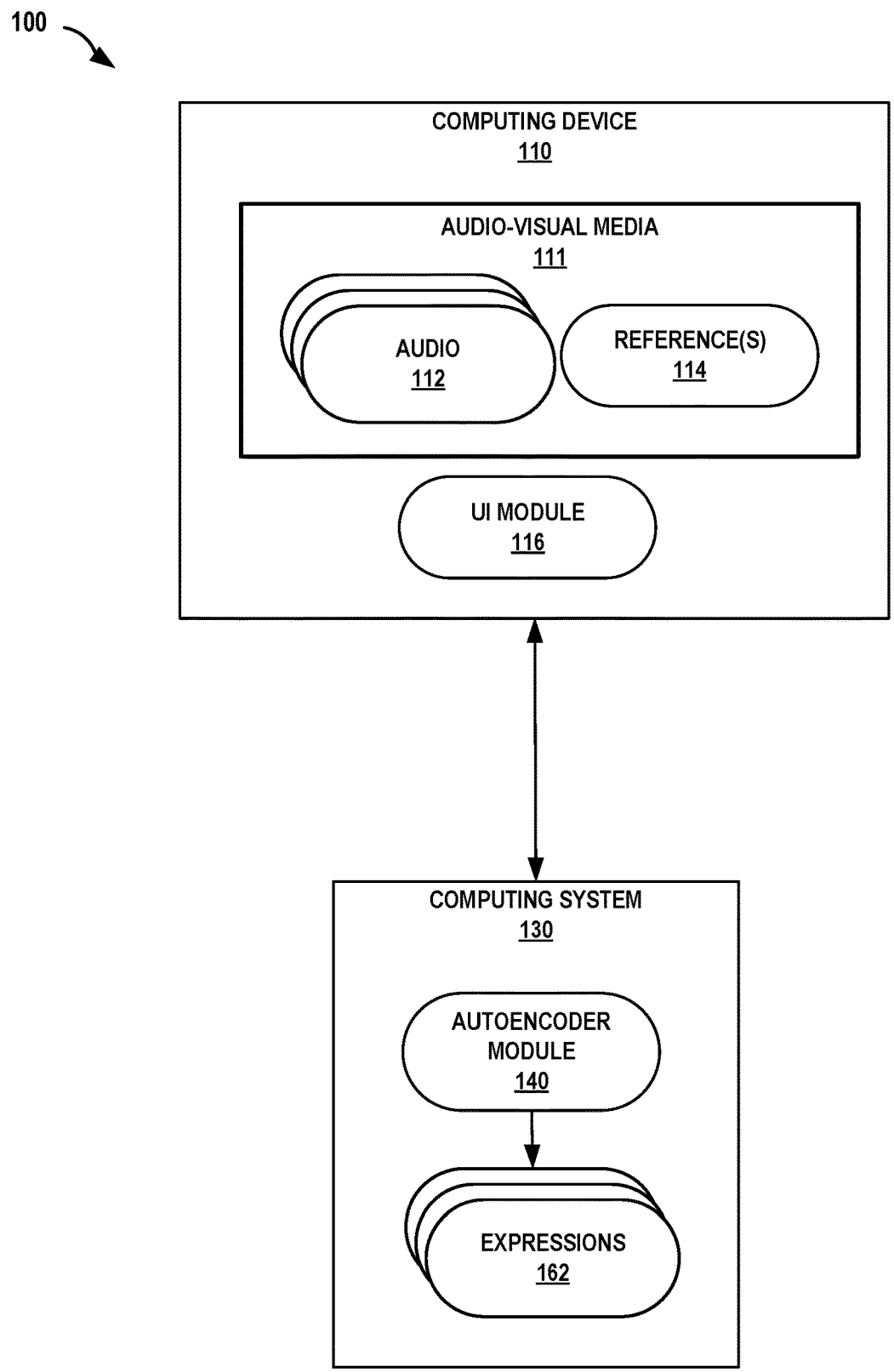
FIG. 1 is a block diagram illustrating an example computing environment for dubbing video based on input audio, in accordance with one or more aspects of the present disclosure.

FIG. 1 is a block diagram illustrating example computing environment 100 for dubbing video based on input audio, in accordance with one or more aspects of the present disclosure. In the example of FIG. 1, computing environment 100 may include computing device 110 and computing system 130. Computing device 110 may include, but is not limited to, portable, mobile, or other devices, such as mobile phones (including smartphones), wearable computing devices (e.g., smart watches, smart glasses, etc.), laptop computers, desktop computers, tablet computers, smart television platforms, server computers, mainframes, infotainment systems (e.g., vehicle head units), etc. In some examples, computing device 110 may represent a cloud computing system that provides one or more services via a network. That is, in some examples, computing device 110 may be a distributed computing system.

Computing device 110 may include audio-visual media 111 and user interface (UI) module 116. Audio-visual media 111 may represent a video file associated with a video having dubbed or translated audio in another language compared to the originally filmed language. Audio-visual media 111 may include audio 112 and references 114. Audio 112 may include the dubbed or translated audio associated with the video of audio-visual media 111. Audio 112 may include audio waveforms for a reference character associated with an identity of a character displayed in the video of audio-visual media 111. Audio 112 may include audio waveforms in an audio file (e.g., MP4, WAV, etc.). References 114 may include a facial structure of the reference character displayed in the video of audio-visual media 111. References 114 may include reference facial structures of characters with lips of the characters masked. References 114 may include one or more reference facial structures of a character's face determined from analyzing the character's face in various angles and/or under various lighting conditions. References 114 may include multiple identity parameters associated with the one or more reference facial structures of the character. Although illustrated as stored locally at computing device 110 in the example of FIG. 1, audio-visual media 111 may be stored at computing system 130.

UI module 116 of computing device 110 may perform operations described herein using hardware, software, firmware, or a mixture thereof residing in and/or executing at computing device 110. Computing device 110 may execute UI module 116 with one processor or with multiple processors. In some examples, computing device 110 may execute UI module 116 as a virtual machine executing on underlying hardware. UI module 116 may execute as one or more services of an operating system or computing platform or may execute as one or more executable programs at an application layer of a computing platform. UI module 116 may be operable by computing device 110 to perform one or more functions, such as receive input and send indications of such input to other components associated with computing device 110, such as a display device of computing device 110. Using the data received, UI module 116 may cause other components associated with computing device 110, such as a display device, to provide output based on the data. For instance, UI module 116 may cause a display device of computing device 110 to output audio-visual media 111.

Computing device 110 may send audio-visual media 111 to computing system 130 responsive to instructions from a user via UI module 116. Computing system 130 may obtain audio-visual media 111 from computing device 110 via any wired or wireless connection, a hard-drive, or the like. Computing system 130 may process audio-visual media 111 to determine expressions 162 for generating an altered version of audio-visual media 111. Throughout the disclosure, examples are described where computing system 130 analyzes information (e.g., wireless ID tags and respective information, locations, context, motion, etc.) associated with a computing device (e.g., computing device 110) and a user of the computing device, only if the computing device receives permission from the user of the computing device to analyze the information. For example, before computing system 130 can collect or may make use of information associated with a user operating computing device 110, the user may be provided with an opportunity to provide input to control whether programs or features of computing system 130 can collect and make use of user information (e.g., information about a user's or user device's current location, such as by GPS or wireless ID tag, etc.), or to dictate whether and/or how computing system 130 may receive content that may be relevant to the user. In addition, certain data may be treated in one or more ways before it is stored or used by computing system 130, so that personally identifiable information is removed. For example, a user's identity and image may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by computing system 130.

Computing system 130 may include, but are not limited to, remote computing systems, such as one or more desktop computers, laptop computers, mainframes, servers, cloud computing systems, etc. capable of sending information to and receiving information from computing device 110 via a network or a wired connection. Computing system 130 may process audio-visual media 111 to generate expressions 162. Computing system 130 may alter audio-visual media with expressions 162 to sync audio 112 with corresponding video of audio-visual media 111. Computing system 130, in the example of FIG. 1, may include autoencoder module 140 and expressions 162. Autoencoder module 140 may represent a machine learning system comprising an autoencoder module, a decoder module, and a bottleneck. In general, computing system 130 may apply an autoencoder of autoencoder module 140 to generate expressions 162 based on audio 112. Expressions 162 may include lip geometries corresponding to audio 112. Expressions 162 may include a series of images (e.g., a video) corresponding to a series of lip geometries of a reference character speaking words associated with audio waveforms of audio 112. In some examples, expressions 162 may include the lip geometries with reference facial geometries associated with an identity of a character represented by references 114. In this way, computing system 130 may recreate the video of audio-visual media 111 to include audio 112 (e.g., dubbed audio) and expressions 162 (e.g., a character's face with a series of lip geometries corresponding to audio 112).

In accordance with the techniques described herein, computing system 130 may generate expressions 162 based on audio 112. Computing system 130 may provide audio 112 to an autoencoder of autoencoder module 140 to generate expressions 162. Expressions 162 may include a series of lip geometries stored as a video file or a series of vector graphics. Autoencoder module 140 may include any type of autoencoder such as a Vanilla Autoencoder, Convolutional Autoencoder, Variational Autoencoder, Recurrent Autoencoder, Sparse Autoencoder, Contractive Autoencoder, Fully Connected Autoencoder, or the like. In the example of FIG. 1, autoencoder module 140 may include a Vector Quantized Variational Autoencoder (VQ-VAE). Autoencoder module 140 may include an autoencoder comprising an encoder, a codebook, and a decoder. The encoder and decoder of autoencoder module 140 may include any types of machine learning algorithms, such as convolutional neural networks. The codebook of autoencoder module 140 may include a multi-modal embedding space with embedding vectors representing discrete, learned combinations of audio, expressions, and reference facial geometries.

Computing system 130 may train and optimize the decoder and the encoder, as well as learn and optimize the codebook. Computing system 130 may train and optimize the autoencoder machine learning system of autoencoder module 140 based on loss values determined during a training process including training expressions, training audio waveforms, and training references. Computing system 130 may adjust parameters of machine learning algorithms (e.g., neural network algorithms) of the encoder module and decoder module based on a determined reconstruction loss value. Computing system 130 may adjust parameters of machine learning algorithms of the encoder module based on a determined commitment loss value. Computing system 130 may learn the plurality of embedding vectors included in the codebook of autoencoder module 140 based on a determined codebook alignment loss value. In some examples, computing system 130 may train the autoencoder machine learning system of autoencoder module 140 to scale to an arbitrary number of expressions and/or facial identities. Computing system 130 may obtain parameters from the autoencoder machine learning system to determine a scaling factor. Computing system 130 may apply the scaling factor to raw expressions output by the decoder module to determine a final expression. In this way, autoencoder module 140 may generate expressions 162 to accurately correspond to audio 112 even if the autoencoder machine learning system was not specifically trained with reference facial geometries and audio associated with audio-visual media 111.

In operation, computing system 130 may apply autoencoder module 140 to output expressions 162 based on audio 112. Autoencoder module 140 may include an encoder module trained to generate encoding vectors. Autoencoder module 140 may generate an encoding vector by providing an audio waveform of audio 112 to an encoder module of autoencoder module 140. Autoencoder module 140 may generate an encoding vector based on a predicted expression generated with the encoder module. Autoencoder module 140 may implement the encoder module to predict expressions based on audio 112. For example, autoencoder module 140 may predict an expression with a neural network trained to predict a series of lip geometries when provided with an audio waveform. In some instances, autoencoder module 140 may predict an expression based on audio 112 and reference facial geometries (e.g., mouth curvature, mouth openness, etc.) of references 114. Autoencoder module 140 may predict an expression by providing audio 112 and references 114 as inputs to a neural network trained to output series of lip geometries. Autoencoder module 140 may generate encoding vectors based on the predicted expressions. For example, autoencoder module 140 may predict an expression that is 256 pixels by 256 pixels in an image file. Autoencoder module 140 may generate an encoding vector with 32 floating values specifying a reduced representation of the predicted expression.

Autoencoder module 140 may determine an embedding vector of a plurality of embedding vectors of a codebook based on the encoding vector. Autoencoder module 140 may determine the embedding vector of the codebook based on the encoding vector by determining which embedding vector of the plurality of embedding vectors is closest to the generated encoding vector. For example, autoencoder module 140 may map the generated encoding vector to an embedding space of the codebook of autoencoder module 140. Autoencoder module 140 may determine the embedding vector based on the embedding vector being the closest embedding vector to the mapped encoding vector. Autoencoder module 140 may determine the embedding vector nearest to the mapped encoding vector with a nearest neighbor look-up.

Autoencoder module 140 may provide the determined embedding vector to a decoder module of autoencoder module 140. Autoencoder module 140 may generate expressions 162 by providing the embedding vector to the decoder module. Autoencoder module 140 may apply the decoder module to generate expressions 162 that may include a face, according to reference facial geometries of references 114, with a series of lip geometries extracted from the determined embedding vector. In some instances, autoencoder module 140 may output expressions 162 as a video file including an altered version of audio-visual media comprising audio 112 with the series of lip geometries on a character's face according to the facial geometries of references 114. For example, a decoder module of autoencoder module 140 may be trained to output altered image frames based on expressions 162. Autoencoder module 140 may output altered image frames that include a reanimated representation of a subject included in original image frames with lip geometries according to expressions 162. In some examples, autoencoder module 140 may output expressions 162 to a generative machine learning model trained to output the altered image frames (e.g., a reanimated or reconstructed version of original image frames of audio-visual media 111 according to expressions 162). Computing system 130 may provide computing device 110 with video files including the altered image frames (e.g., an altered version of audio-visual media 111 according to expressions 162). Computing device 110 may display the altered image frames with audio 112 via UI module 116.

While computing device 110 and computing system 130 are illustrated as separate systems, functionality performed by computing device 110 may be performed by computing system 130. For example, computing system 130 may store audio-visual media 111. Computing system 130 may include a display device to display audio-visual media with audio 112 and expressions 162 via a user interface module associated with the display device of computing system 130.

The techniques may provide one or more technical advantages that realize one or more practical applications. For example, computing system 130 may apply a machine learning system (e.g., autoencoder module 140) to output expressions 162 that accurately corresponds to audio 112. By applying autoencoder module 140 to generate expressions 162, computing system 130 may accurately dub audio-visual media 111 without having to employ specially configured discriminators, or use a generative adversarial network, for example. Autoencoder module 140 may include a codebook with discrete audio-expression pairs that may avoid overfitting when training the machine learning system. In this way, computing system 130 may accurately dub audio-visual media 111 by generating a video with audio 112 and expressions 162 in real-time with a fewer amount of training data, compared to previous techniques.

Figure 2:
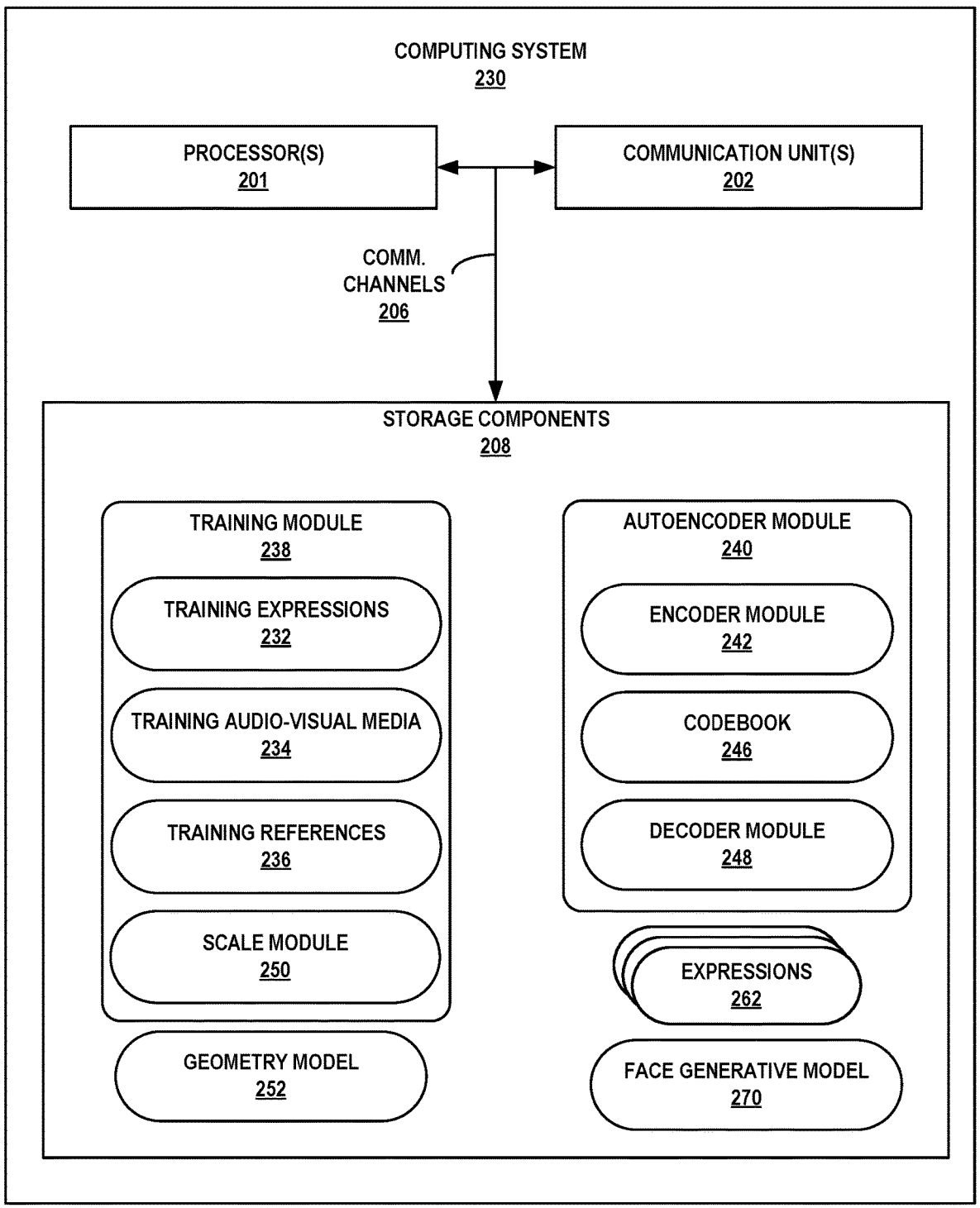
FIG. 2 is a block diagram illustrating an example computing system for dubbing video with an autoencoder module, in accordance with one or more aspects of the present disclosure.

FIG. 2 is a block diagram illustrating example computing system 230 for dubbing video with autoencoder module 240, in accordance with one or more aspects of the present disclosure. Computing system 230, autoencoder module 240, and expressions 262 of FIG. 2 may be example or alternative implementations of computing system 130, autoencoder module 140, and expressions 162 of FIG. 1, respectively. FIG. 2 illustrates only one particular example of computing system 230, and many other examples of computing system 230 may be used in other instances and may include a subset of components included in example computing system 230 or may include additional components not shown in FIG. 2. For example, functionality of processors 201, communication units 202, and/or storage components 208 may be distributed across multiple computing devices within a cloud-based environment provided by computing system 230.

In the example of FIG. 2, computing system 230 may include one or more processors 201, communication units 202, and storage components 208. Communication channels 206 ("COMM channel 206") may interconnect each of the components 201, 202, and 208 for inter-component communications (physically, communicatively, and/or operatively). In some examples, communication channel 206 may include a system bus, a network connection, an inter-process communication data structure, or any other method for communicating data.

Communication units 202 of computing system 230 may communicate with one or more external devices via one or more wired and/or wireless networks by transmitting and/or receiving network signals on the one or more networks. Examples of communication units 202 include a network interface card (e.g., such as an Ethernet card), an optical transceiver, a radio frequency transceiver, a GNSS receiver, or any other type of device that can send and/or receive information. Other examples of communication units 202 may include short wave radios, cellular data radios (for terrestrial and/or satellite cellular networks), wireless network radios, as well as universal serial bus (USB) controllers.

Processors 201 may implement functionality and/or execute instructions within computing system 230. For example, processors 201 may receive and execute instructions that provide the functionality of training module 238 and autoencoder module 240. These instructions executed by processors 201 may cause computing system 230 to store and/or modify information within storage components 208 or processors 201 during program execution. Processors 201 may execute instructions of training module 238 and autoencoder module 240 to perform one or more operations. That is training module 238 and autoencoder module 240 may be operable by processors 201 to perform various functions described herein.

In the example of FIG. 2, storage components 208 may include training module 238, autoencoder module 240, and expressions 262. Storage components 208 within computing system 230 may store information for processing during operation of computing system 230 (e.g., computing system 230 may store data accessed by training module 238 and autoencoder module 240 during execution at computing system 230). In some examples, storage components 208 may be a temporary memory, meaning that a primary purpose of storage components 208 is not long-term storage. Storage components 208 on computing system 230 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 208 may include one or more computer-readable storage media. Storage components 208 may be configured to store larger amounts of information than volatile memory. Storage components 208 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 208 may store program instructions and/or information associated with training module 238 and autoencoder module 240.

Storage components 208 may store training module 238, geometry model 252, autoencoder module 240, expressions 262, and face generative model 270. Autoencoder module 240 may include encoder module 242, codebook 246, and decoder module 248. Encoder module 242 may include one or more neural networks (e.g., convolutional neural networks, deep neural networks, etc.) trained to generate encoding vectors mapped to an embedding space of codebook 246. Encoder module 242 may include a neural network trained to generate encoding vectors by predicting an expression based on an input audio. Encoder module 242 may predict expressions based on masked images derived from training audio-visual media 234 and facial geometric information derived from training expressions 232. Encoder module 242 may generate the encoding vectors by converting predicted expressions to a reduced size image vector with the same dimensions as embedding vectors of codebook 246.

Codebook 246 may include embedding vectors mapped to an embedding or latent space. Codebook 246 may include a discrete number of embedding vectors. For example, codebook 246 may include an embedding space with 1,024 embedding vectors. Autoencoder module 240 may map encoding vectors generated by encoder module 242 to the embedding space of codebook 246. Autoencoder module 240 may select or determine an embedding vector of codebook 246 based on the mapping of the encoding vector in the embedding space of codebook 246.

Autoencoder module 240 may determine an embedding vector from the discrete set of embedding vectors of codebook 246 based on the embedding vector nearest to the mapped encoding vector. Codebook 246, in some examples, may include embedding vectors of encoded face video frames. In some examples, codebook 246 may include embedding vectors with tokens corresponding to facial textures. Autoencoder module 240 may provide the determined embedding vector to decoder module 248.

Decoder module 248 may include one or more neural networks (e.g., convolutional neural networks, deep neural networks, etc.) trained to generate expressions 262 based on embedding vectors. Decoder module 248 may obtain a determined embedding vector of codebook 246 to generate expressions 262 based on the embedding vector. Decoder module 248 may generate expressions 262 based on the embedding vector by decoding the embedding vector to recreate a learned expression associated with the embedding vector.

Face generative model 270 may include one or more generative machine learning models (e.g., neural networks) trained to reanimate audio-visual media according to expressions 262. Face generative model 270 may render audio-visual media based on a series of masked images (e.g., images of audio-visual media that masks or hides a lip portion of a subject's face) and expressions 262. For example, face generative model 270 may generate an image frame for audio-visual media to include facial features of a subject based on a masked image of the subject, as well as a lip geometry corresponding to a frame of the audio-visual media included in expressions 262.

Geometry model 252 may include one or more machine learning models (e.g., neural networks, transformer models, etc.) trained to extract geometric features as parameters. Geometry model 252 may register raw data (e.g., training audio-visual media 234). Geometry model 252 may track expressions with parametric model fitting. Geometry model 252 may synthesize realistic and diverse training data based on the parametric model fitting. For example, geometry model 252 may generate training expressions 232 by extracting expression parameters corresponding to geometric features of lip geometries in one or more image frames of audio-visual media (e.g., training audio-visual media 234). Geometry model 252 may generate training references 236 by extracting identity parameters corresponding to geometric features of an identity of a subject producing speech in audio-visual media, for example.

In the example of FIG. 2, training module 238 may include training expressions 232, training audio-visual media 234, training references 236, and scale module 250. Training audio-visual media 234 may include training audio waveforms and video (e.g., a series of original image frames). Training audio-visual media 234 may include many types of audio-visual media with a training subject speaking (e.g., audio-visual media with a training subject depicted from different angles or under different lighting conditions). Training module 238 may store training expressions 232 and training references 236 by providing training audio-visual media 234 to geometry model 252. Training expressions 232 may include vector graphics specifying lip geometries of training subjects. Training expressions 232 may include vector graphics specifying lip geometries of training subjects angled in various directions. In some examples, training expressions 232 may include vector graphics specifying lip geometries of training subjects angled in various directions of training subjects under various lighting conditions. Training references 236 may include vector graphics specifying facial geometries of training subjects. Training references 236 may include vector graphics specifying facial geometries such as mouth shape, lip contours, cheekbone shape, or the like. In some examples, training references 236 may include a reference representing an identity of a training subject in terms of facial features.

Training module 238 may use training expressions 232, training audio-visual media 234, and/or training references 236 to train one or more neural networks of encoder module 242. Training module 238 may train encoder module 242 to predict expressions based on an audio waveform. For example, training module 238 may train encoder module 242 to predict expressions by providing training audio waveforms of training audio-visual media 234 and identity parameters associated with training references 236 to encoder module 242 to configure parameters of a neural network of encoder module 242 to output expressions in the same format as training expressions 232. Training module 238 may train encoder module 242 to convert predicted expressions to encoding vectors that are compatible with an embedding space of codebook 246 by providing a neural network of encoder module 242 with expression parameters associated with training expressions 232. For example, encoder module 242 may be trained to generate encoding vectors that encode a predicted expression to tokens corresponding to facial textures.

Training module 238 may use training expressions 232, training audio-visual media 234, and/or training references 236 to learn an embedding space and corresponding embedding vectors of codebook 246. Training module 238 may establish embedding vectors of codebook 246 by employing encoder module 242 to encode training expressions 232 into training embedding vectors included in a latent space of codebook 246. Encoder module 242 may generate training encoding vectors based on training expressions 232. Training module 238 may map training encoding vectors to an embedding space of codebook 246 that includes training embedding vectors. Training module 238 may adjust training embedding vectors based on training audio waveforms of training audio-visual media 234. For example, training module 238 may provide a training audio waveform of training audio-visual media 234 to encoder module 242. Encoder module 242 may generate a training encoding vector based on the training audio waveform, training expressions 232, and/or training references 236. Autoencoder module 240 may determine a training embedding vector by mapping the training encoding vector to the embedding space of codebook 246. Autoencoder module 240 may provide the determined training embedding vector to decoder module 248. Decoder module 248 may decode the determined training embedding vector to generate a learning expression for reconstructing the original audio-visual media piece (e.g., decode the training embedding vector to reconstruct image frames of the training instance associated with the training audio waveform). Training module 238 may calculate loss values (e.g., a reconstruction loss value, a codebook alignment loss value, commitment loss value, etc.) associated with the learning expression output by decoder module 248 based on a comparison of the learning expression to original image frames of the training audio-visual media piece. Training module 238 may generate embedding vectors of codebook 246 by adjusting training embedding vectors based on the calculated loss values. In this way, training module 238 may optimize embedding vectors of codebook 246 to align with varying environmental conditions such as different lighting of a subject's face. Training module 238 may adjust parameters of neural networks of encoder module 242 and decoder module 248 based on the calculated loss values.

Training module 238 may use training expressions 232, training audio-visual media 234, and/or training references 236 to train one or more neural networks of decoder module 248. Training module 238 may provide identity parameters associated with training references 236 to a neural network of decoder module 248 to train decoder module 248 to decode embedding vectors. In some examples, decoder module 248 may decode embedding vectors into raw expressions. Training module 238 may use scale module 250 to determine a scaling factor applied to raw expressions generated by decoder module 248. Training module 238 may provide scale module 250 with parameters of autoencoder module 240 to determine a scale factor. Scale module 250 may provide autoencoder module 240 the determined scale factor. Autoencoder module 240 may apply the scale factor to the raw expression generated by decoder module 248 to generate expressions 262.

Decoder module 248 may be trained to generate an altered image frame to include a lip geometry from a decoded expression, as well as a decoded facial texture corresponding to a geometric representation of the speaker's face. Decoder module 248 may be trained to iteratively decode determined embedding vectors of codebook 246 to generate an animation (e.g., a series of altered image frames) that alters original image frames of audio-visual media to include expressions, facial characteristics, and/or facial geometries aligned with audio of the audio-visual media. In some examples, training module 238 may train decoder module 248 to generate altered image frames that recreate an original set of image frames to include the decoded expression, as well as facial textures. Training module 238 may train decoder module 248 by providing decoder module 248 with an extracted geometric representation of a subject, a masked image of the subject (e.g., an image of the subject that masks the lip portion of the subject), and/or an image of the subject at a different time frame. In this example, autoencoder module 240 may combine input audio with the altered image frames to generate an audio-visual media piece that is in a language different than originally filmed and with facial expressions as if the different language was actually spoken by the subject.

In some instances, training module 238 may train face generative model 270 to generate altered image frames according to expressions 262. Training module 238 may provide masked representations of faces (e.g., an image of a face with the mouth area masked) derived from training audio-visual media 234, as well as expressions output by decoder module 248, to train face generative model 270 to generate a series of altered image frames according to expressions 262 included in dubbed audio-visual media. Face generative model 270 may be trained to generate altered image frames to include facial textures (e.g., geometric representations) based on original image frames. For example, face generative model 270 may be trained to generate altered image frames by overlaying lip geometries of expressions 262 on the masked portions of masked images derived from training audio-visual media 234. Face generative model 270 may be trained to generate the series of altered image frames that match a lip geometry of expressions 262 to a frame of training audio-visual media 234 based on matching a timestamp included in masked images derived from training audio-visual media 234 to a timestamp associated with lip geometries of expressions 262.

Figure 3:
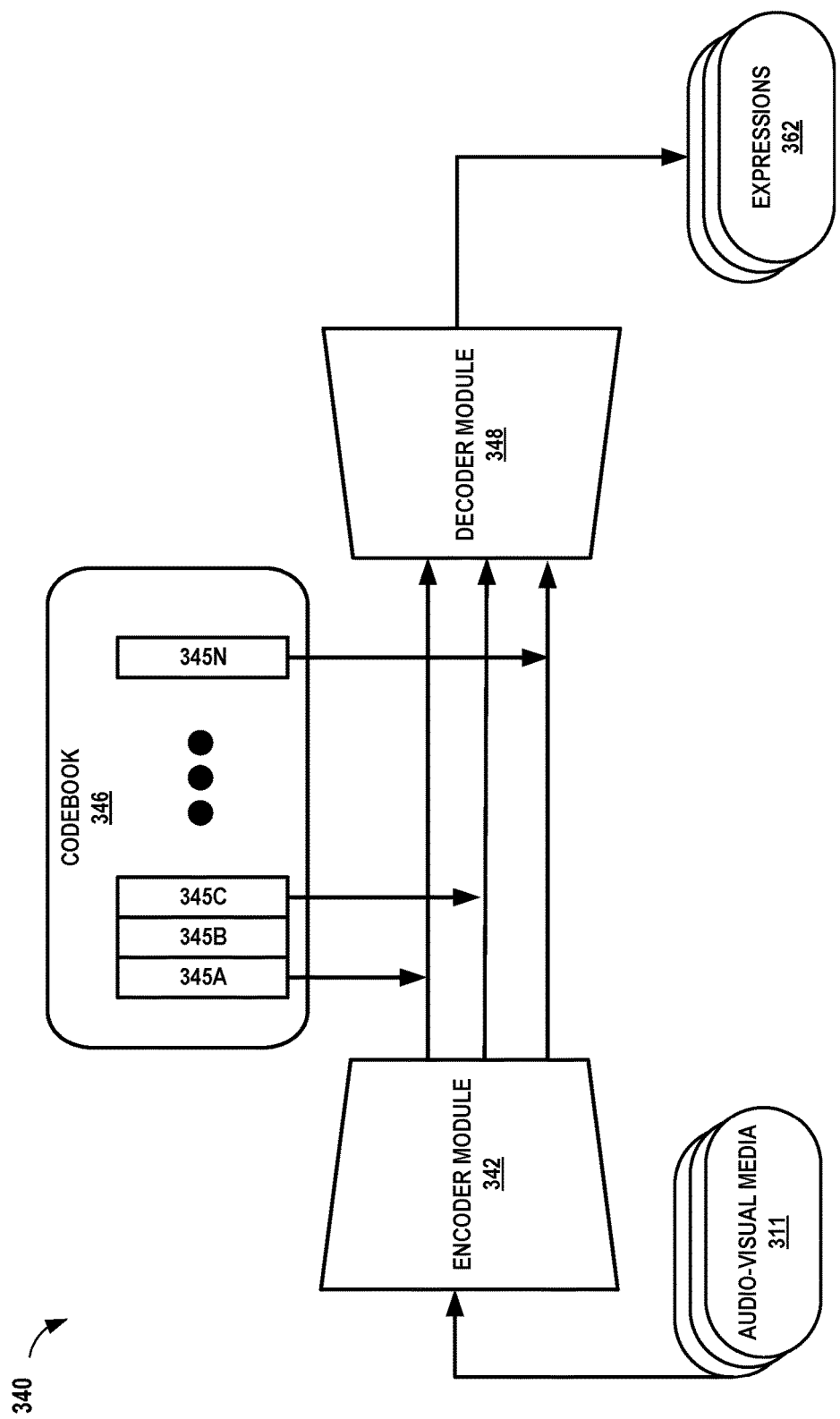
FIG. 3 is a block diagram illustrating an example autoencoder for dubbing video based on input audio-visual media, in accordance with one or more aspects of the present disclosure.

FIG. 3 is a block diagram illustrating example autoencoder 340 for dubbing video based on audio-visual media 311, in accordance with one or more aspects of the present disclosure. Autoencoder 340, encoder module 342, codebook 346, decoder module 348, and expressions 362 of FIG. 3 may be example or alternative implementations of autoencoder module 240, encoder module 242, codebook 246, decoder module 248, and expressions 262 of FIG. 2, respectively. Codebook 346, in the example of FIG. 3, may include embedding vectors 345A-345N (collectively referred to herein as "embedding vectors 345"). Embedding vectors 345 may include discrete, fixed-sized vectors mapped in a latent space of codebook 346. Embedding vectors 345 may include vectors each corresponding to an expression learned during the training process.

Autoencoder 340 may provide audio-visual media 311 to encoder module 342. Encoder module 342 may predict an expression based on audio waveforms of audio-visual media 311. Encoder module 342 may generate an encoding vector to include a reduced version of the predicted expression. Autoencoder 340 may map the encoding vectors to an embedding space of codebook 346. Autoencoder 340 may determine an embedding vector of embedding vectors 345 based on an encoding vector generated by encoder module 342.

In the example of FIG. 3, encoder module 342 may generate a first encoding vector, a second encoding vector, and a third encoding vector. Autoencoder 340 may map the first encoding vector, the second encoding vector, and the third encoding vector to the embedding space of codebook 346. Autoencoder 340 may determine embedding vector 345A is nearest to the first encoding vector when mapped to the embedding space of codebook 346. Autoencoder 340 may determine embedding vector 345C is nearest to the second encoding vector when mapped to the embedding space of codebook 346. Autoencoder 340 may determine embedding vector 345C is nearest to the third encoding vector when mapped to the embedding space of codebook 346.

Autoencoder 340 may provide the determined embedding vectors to decoder module 348. For example, autoencoder 340 may provide embedding vector 345A, embedding vector 345C, and embedding vector 345N to decoder module 348. Decoder module 348 may decode embedding vector 345A, embedding vector 345C, and embedding vector 345N to generate expressions 362. In some instances, decoder module 348 may generate expressions 363 to include raw expressions (e.g., geometric representations of lip geometries) based on determined embedding vectors 345. Decoder module 348 may apply a scaling factor to the generated raw expressions to generate expressions 362. In some examples, decoder module 348 may be trained to generate an altered version of audio-visual media 311 to include the original input audio waveforms and altered image frames of a subject that keeps the same identity of the subject but with lip geometries included in expressions 362.

Figure 4:
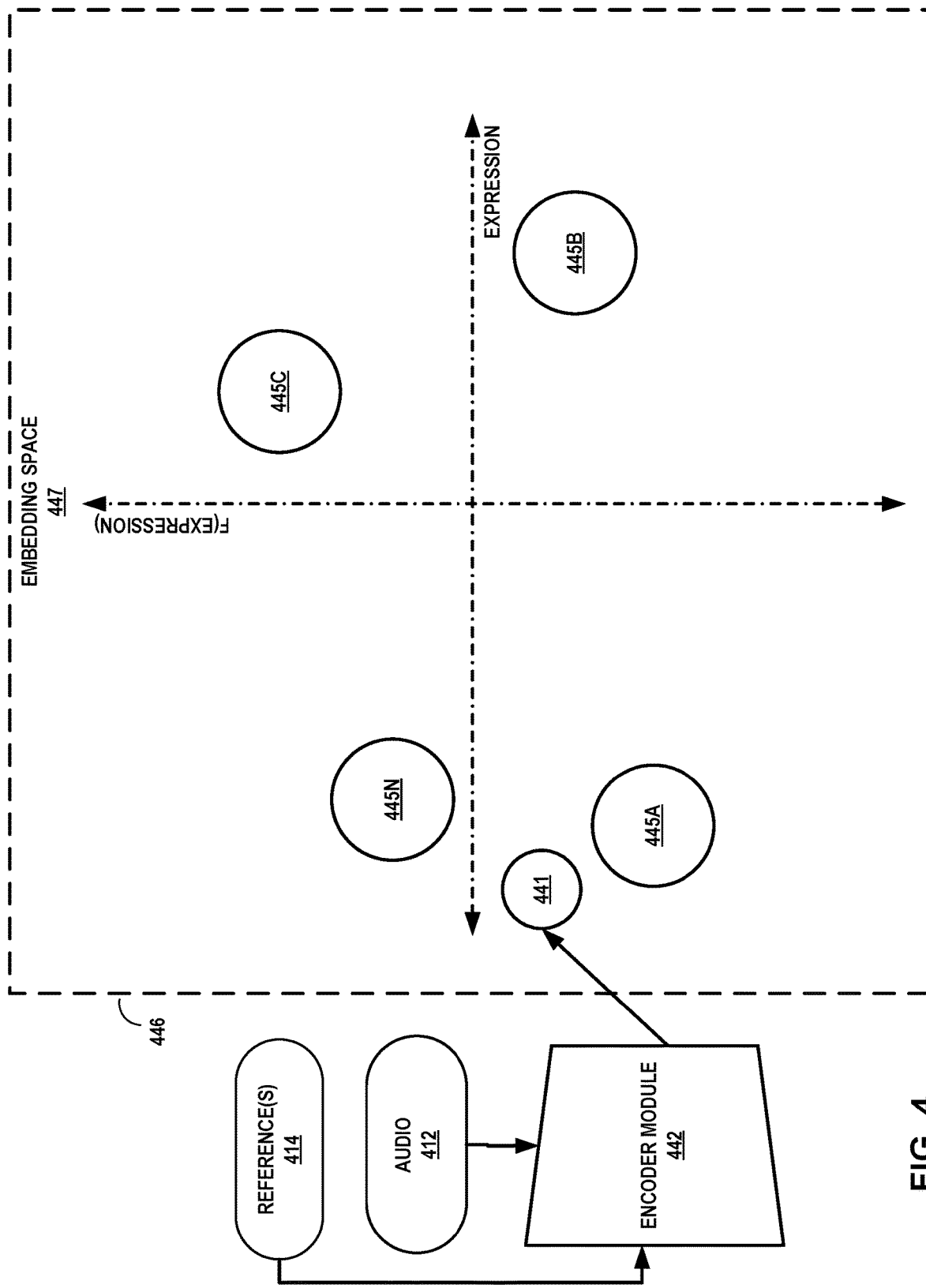
FIG. 4 is a conceptual diagram illustrating an example operation of mapping encoding vectors to an embedding space of a codebook, in accordance with one or more aspects of the present disclosure.

FIG. 4 is a conceptual diagram illustrating an example operation of mapping encoding vector 441 to embedding space 447 of codebook 446, in accordance with one or more aspects of the present disclosure. Encoder module 442, codebook 446, and embedding vectors 445 of FIG. 4 may be example or alternative implementations of encoder module 342, codebook 346, and embedding vectors 345 of FIG. 3, respectively. Codebook 446, in the example of FIG. 4, includes embedding space 447. Embedding space 447 may include a latent space comprising discrete embedding vectors 445A-N (collectively referred to herein as embedding vectors 445). Embedding space 447 may include a latent space with a dimension corresponding to various expressions and a dimension of a modeling function with expressions as a parameter. Embedding vectors 445 of embedding space 447 may be learned by, for example, adjusting training embedding vectors based on a loss function determined during the training phase (e.g., the training phase conducted by training module 238 of FIG. 2).

Encoder module 442 may predict an expression based on audio 412. Audio 412 of FIG. 4 may be an example or alternative implementation of audio 112 of FIG. 1. Encoder module 442 may include a first neural network that is provided expression parameters corresponding to a series of one or more lip geometries learned during the training phase. Encoder module 442 may predict an expression based on audio 412 by generating a predicted expression according to expression parameters learned in the training phase (e.g., training module 238 of FIG. 2 training a machine learning model of encoder module 442 to predict expressions for a subject based on expression parameters associated with training expressions 232 generated by geometry model 252). In some examples, encoder module 442 may include a second neural network that is provided identity parameters corresponding to reference identities (e.g., references 414). Encoder module 442 may predict expressions based on audio 412 and references 414. References 414 of FIG. 4 may be an example or alternative implementation of references 114 of FIG. 1. Encoder module 442 may be trained to predict expressions based on expression parameters and identity parameters learned in the training phase (e.g., training module 238 of FIG. 2 training a machine learning model of encoder module 442 to predict expressions for a subject based on expression parameters associated with training expressions 232 and identity parameters associated with training references 236 generated by geometry model 252). In this way, encoder module 442 may accurately maintain an identity of a subject based on facial characteristics (e.g., mouth openness, lip shape, etc.) of references 414 corresponding to a subject audio 412 is depicted as originating from in an audio-visual media piece (e.g., audio-visual media 111 of FIG. 1).

Encoder module 442 may encode a predicted expression as encoding vector 441. Encoder module 442 may encode the predicted expression as encoding vector 441 by reducing the predicted expression to a vector including representations of geometric features corresponding to the predicted expression. Encoder module 442 may map encoding vector 441 in embedding space 447. Encoder module 442 may map encoding vector 441 by inputting the predicted expression in the model function of codebook 446. Encoder module 442 may determine an embedding vector of embedding vector 445 based on the mapping of encoding vector 441. For example, encoder module 442 may select embedding vector 445A based on determining embedding vector 445A is the nearest embedding vector to encoding vector 441 in embedding space 447. Encoder module 442 may provide embedding vector 445A to a decoder module (e.g., decoder module 248) to decode embedding vector 445A to an expression that includes a series of lip geometries.

Figure 5:
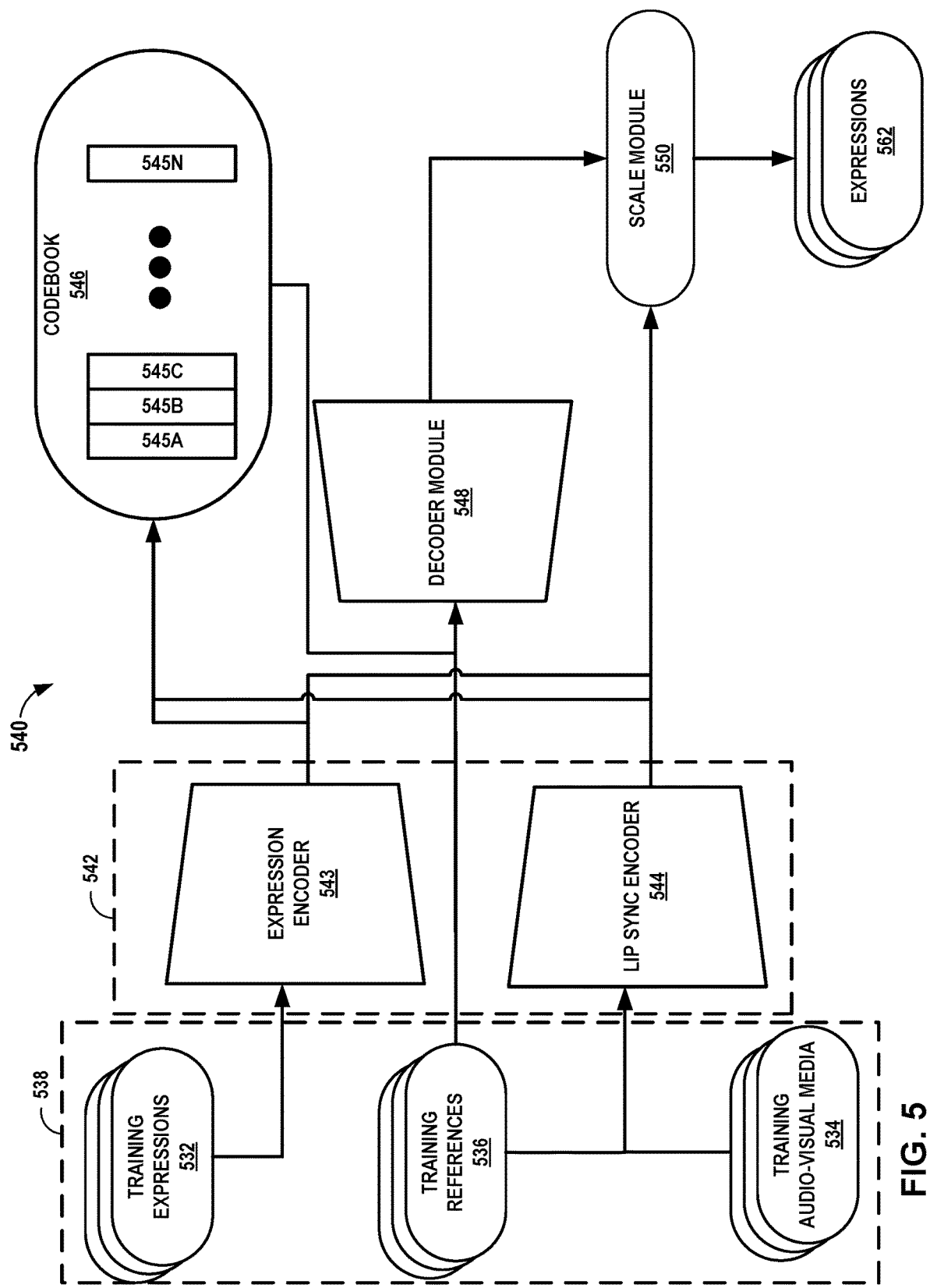
FIG. 5 is a block diagram illustrating an example operation of training an autoencoder to dub video, in accordance with one or more aspects of the present disclosure.

FIG. 5 is a block diagram illustrating an example operation of training autoencoder 540 to dub video, in accordance with one or more aspects of the present disclosure. Autoencoder 540, encoder module 542, codebook 546, decoder module 548, scale module 550, expressions 562, training expressions 532, training references 536, and training audio-visual media 534 of FIG. 5 may be example or alternative implementations of autoencoder module 240, encoder module 242, codebook 246, decoder module 248, scale module 250, expressions 262, training expressions 232, training references 236, and training audio-visual media 234 of FIG. 2, respectively. Embedding vectors 545 may be an example or alternative implementations of embedding vectors 445 of FIG. 4.

In the example of FIG. 5, encoder module 542 of autoencoder 540 may include expression encoder 543 and lip sync encoder 544. Expression encoder 543 may include a first machine learning model (e.g., a convolutional neural network) with expression parameters corresponding to training expressions 532. Training expressions 532 may include a set of training lip geometries of training audio-visual media pieces with corresponding expression parameters extracted by a machine learning model (e.g., geometry model 252 of FIG. 2). Training module 538 may train expression encoder 543 to map encoded expressions to codebook 546 by providing training expressions 532 to a machine learning model of expression encoder 543. Training module 538 may obtain training expressions 532 from a geometric model (e.g., geometry model 252 of FIG. 2) configured to extract expression parameters (e.g., parameters associated with lip geometries of a subject) from training data such as training audio-visual media 534. Training module 538 may configure parameters of the machine learning model of expression encoder 543 to include expression parameters of training expressions 532.

Lip sync encoder 544 may include a second machine learning model (e.g., a convolutional neural network) with identity parameters corresponding to training references 536. Training references 536 may include a set of training geometric features of an identity of a subject of training audio-visual media with corresponding identity parameters extracted by a machine learning model (e.g., geometry model 252 of FIG. 2). Training module 538 may train lip sync encoder 544 to predict expressions based on training audio waveforms of training audio-visual media 534. Training module 538 may train lip sync encoder 544 to predict expressions based on a frequency and/or amplitude of training audio waveforms of training audio-visual media 534. Training module 538 may configure parameters of the machine learning model of lip sync encoder 544 to include identity parameters corresponding to training references 536. Training module 538 may obtain training references 536 from a geometric model (e.g., geometry model 252 of FIG. 2) configured to extract identity parameters (e.g., parameters associated with facial characteristics of a subject) from training data such as training audio-visual media 534. Lip sync encoder 544 may be trained to predict expressions by learning to identify an identity (e.g., distinctive facial characteristics) of a subject based on identity parameters of training references 536. Lip sync encoder 544 may pair predicted expressions with facial characteristics associated with the identity. Lip sync encoder 544 may provide the predicted expression, facial characteristic pair to expression encoder 543. Expression encoder 543 may encode the predicted expression and corresponding facial characteristics into an encoding vector. Expression encoder 543 may map the encoding vector to an embedding space of codebook 546. In some examples, lip sync encoder 544 may be configured to encode a predicted expression and facial characteristics into an encoding vector and map the encoding vector to codebook 546. In this example, expression encoder 543 may adjust the mapping of the encoding vector based on expression parameters of the machine learning model of expression encoder 543.

Autoencoder 540 may determine an embedding vector of embedding vector 545 based on the mapping of the encoding vector. Autoencoder 540 may select an embedding vector of codebook 546 that is nearest to the mapped encoding vector. Autoencoder 540 may determine the nearest embedding vector by comparing values of embedding vectors 545 to values of the encoding vector. In some examples, values of embedding vectors 545 and encoding vectors may include an output of a model function provided with expression values (e.g., value corresponding to lip geometries) and facial characteristic values (e.g., values corresponding to an identity of a subject) of an encoding vector generated by encoder module 542. Autoencoder 540 may provide the selected embedding vector to decoder module 548.

Decoder module 548 may be trained to decode a selected embedding vector to an expression. Training module 538 may train decoder module 548 to generate an expression that includes facial characteristics based on training references 536. Training module 538 may train decoder module 548 with training references 536 by, for example, providing a machine learning model of decoder module 548 with identity parameters included in training references 536. Decoder module 548 may generate an expression with facial characteristics by applying the identity parameters to a decoded expression determined based on the selected embedding vector. In some examples, training module 538 may provide decoder module 548 with training references 536 that include masked images of subjects derived from training audio-visual media 534. Decoder module 548 may combine decoded expressions from a selected embedding vector and the masked image to generate an altered image frame for dubbed audio-visual media that includes lip geometry of the decoded expression.

In some instances, decoder module 548 may decode a selected embedding vector to a raw expression. Scale module 550 may alter the raw expression to expressions 562 that considers identities and environmental conditions of subjects that may not have been considered during the training phase. In the example of FIG. 5, scale module 550 may determine a scale factor based on parameters of one or more machine learning models of expression encoder 543, one or more machine learning models of lip sync encoder 544, and one or more machine learning models of decoder module 548. Scale module 550 may determine a scale factor for autoencoder 540 by inputting parameters of autoencoder 540 to a scaling function (e.g., a parametric function). Scale module 550 may apply the scale factor to raw expressions generated by decoder module 548 to compensate for different magnitudes of expressions and/or facial identities that may be present during inference time.

Training module 538 may adjust parameters of autoencoder 540 by determining loss values during the training phase. For example, training module 538 may determine loss values associated with a difference of expressions 562 compared to an expression of training audio-visual media 534. Training module 538 may determine loss values such as a commitment loss value, a codebook alignment loss value, and/or a reconstruction loss value. Training module 538 may determine a commitment loss value based on embedding vectors 545. Training module 538 may determine a reconstruction loss value based on a training embedding vector determined by mapping a training encoding vector. Training module 538 may determine the reconstruction loss by mapping the training encoding vector generated by providing encoder module 542 training expressions 535 and a training audio waveform of training audio-visual media 534. Training module 538 may adjust parameters of one or more machine learning models of encoder module 542 based on commitment loss values and reconstruction loss values. Training module 538 may adjust parameters of one or more machine learning models of decoder module 548 based on reconstruction loss values. Training module 538 may adjust embedding vectors 545 (e.g., adjusting values of training embedding vectors associated with embedding vectors 545) based on codebook alignment loss values. For example, training module 538 may determine a codebook alignment loss value based on one or more training encoding vectors and training embedding vectors utilized during the training phase.

Figure 6:
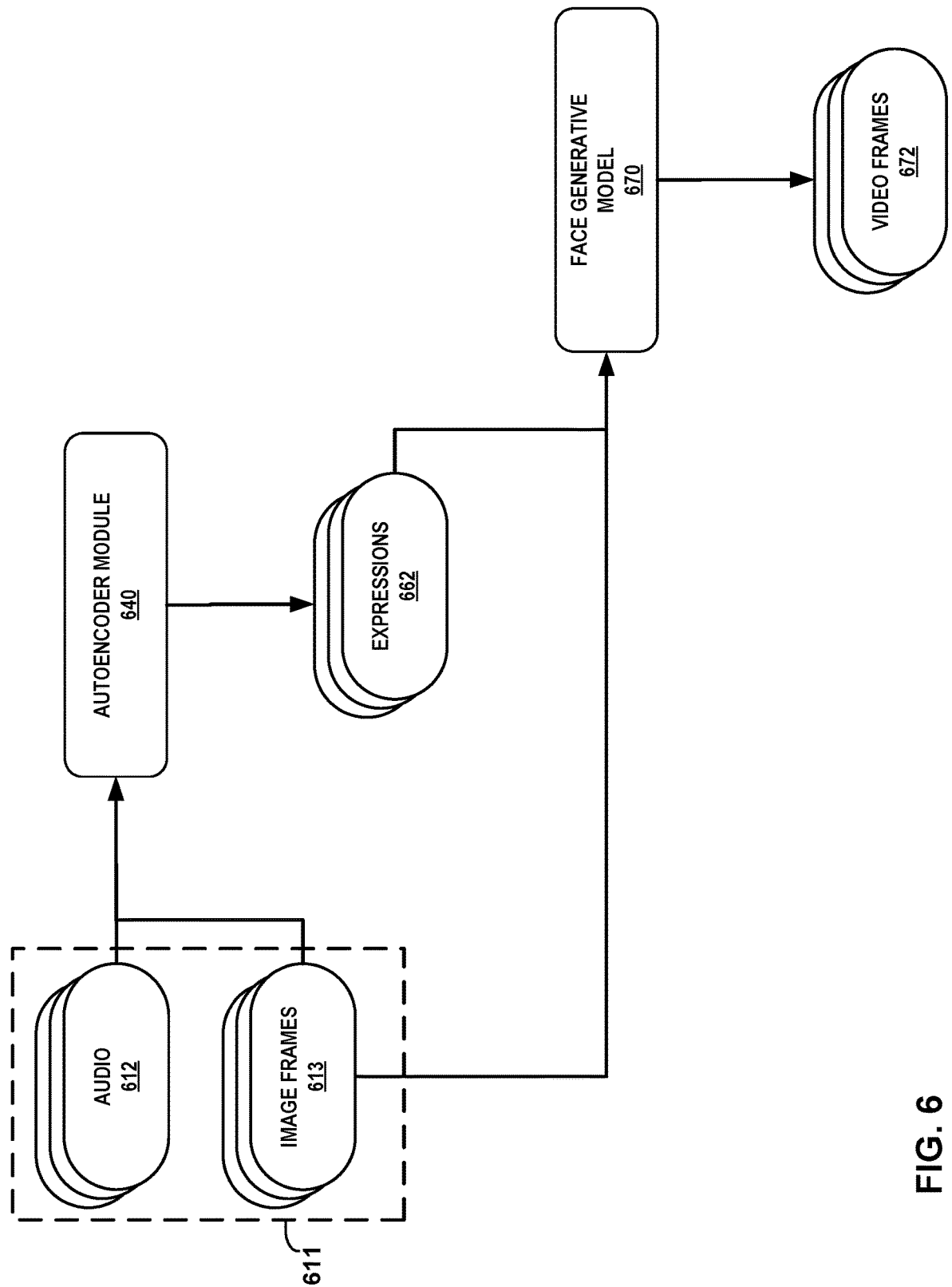
FIG. 6 is a block diagram illustrating an example operation for generating new video frames for dubbed audio-visual media.

FIG. 6 is a block diagram illustrating an example operation for generating video frames 672 for dubbed audio-visual media. Autoencoder module 640, expressions 662, and face generative model 670 of FIG. 6 may be example or alternative implementations of autoencoder module 240, expressions 262, and face generative model 270 of FIG. 2, respectively. Autoencoder module 640, in the example of FIG. 6, may obtain audio-visual media 611. Audio-visual media 611 may be an example or alternative implementation of audio-visual media 111 of FIG. 1.

Autoencoder module 640 may output expressions 662 based on audio-visual media 611. Autoencoder module 640 may extract audio 612 from audio-visual media 611. Audio 612 may include audio waveforms with corresponding timestamps as to a time an audio waveform is output when audio-visual media 611 is playing, via a media player application for example. Autoencoder module 640 may determine a series of lip geometries corresponding to an audio waveform of audio 612. Autoencoder module 640 may determine a series of lip geometries by generating an encoding vector based on an audio waveform of audio 612. Autoencoder module 640 may map the encoding vector to a codebook to select a nearest embedding vector.

Autoencoder module 640 may decode the embedding vector to the series of lip geometries. Autoencoder module 640 may generate expressions 662 to include the series of lip geometries. Autoencoder module 640 may generate expressions 662 to include a series of lip geometries over a period of time corresponding to the timestamps associated with the input audio waveforms of audio 612.

In some instances, autoencoder module 640 may generate expressions 662 to include an extracted geometry. Autoencoder module 640 may extract image frames 613 from audio-visual media 611. Image frames 613 may include original image frames with corresponding timestamps as to a time an image is output when audio-visual media 611 is playing. Autoencoder module 640 may extract a facial geometry from an original image frame of image frames 613. Autoencoder module 640 may extract a facial geometry from the original image except for the facial geometric features associated with a subject's lips (e.g., autoencoder module 640 masking the original image). Autoencoder module 640 may merge the extracted facial geometry and the series of lip geometries to generate expressions 662. Autoencoder module 640 may provide expressions 662 to face generative model 670.

Face generative model 670 may generate video frames 672 based on expressions 662 and image frames 613. Video frames 672 may include altered image frames that maintain an identity of a subject associated with original image frames of image frames 613 but include lip geometries of the subject according to expressions 662. Face generative model 670 may mask the lip portion of a subject's face included in original image frames of image frames 613. Face generative model 670 may use a masked image frame as a reference to an identity of a subject included in original image frames of image frames 613. Face generative model 670 may render an altered image frame of video frames 672 by combining a masked version of the original image frame with an expression of expressions 662 corresponding to the original image frame (e.g., the masked, original image frame and the expression including the same timestamp as to when the original image frame is output when playing audio-visual media 611). Face generative model 670 may generate video frames 672 to include a series of altered image frames (e.g., an altered version of original image frames of image frames 613) with the series of lip geometries of expressions 662, as well as original audio waveforms of audio 612.

Figure 7:
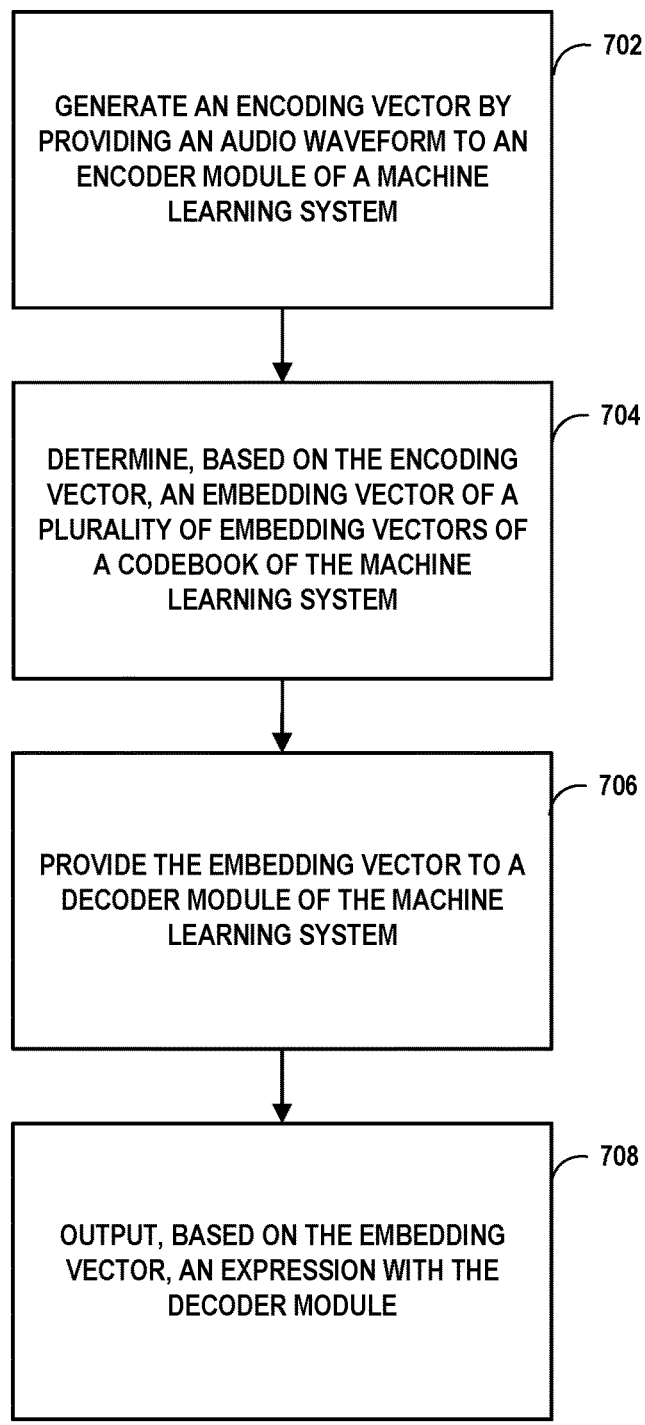
FIG. 7 is a flowchart illustrating an example operation for dubbing video, in accordance with one or more aspects of the present disclosure.

FIG. 7 is a flowchart illustrating an example operation for dubbing video, in accordance with one or more aspects of the present disclosure. FIG. 7 is discussed with respect to FIGS. 1-6 for example purposes only.

Computing system 130 may generate an encoding vector by providing an audio waveform to an encoder module of a machine learning system (702). For example, computing system 130 may obtain audio-visual media 111 from computing device 110. Computing system 130 may provide autoencoder module 140 with audio 112 from audio-visual media 111 as a series of input audio waveforms. Autoencoder module 140 of computing system 130 may generate an encoding vector by, for example, predicting an expression based on audio 112. Autoencoder module 140 may be trained to predict expressions as a series of lip geometries based on expression parameters associated with training expressions 232 of FIG. 2 and/or identity parameters associated with training references 236 provided to neural networks of an encoder of autoencoder module 140, for example. Autoencoder module 140 may generate the encoding vector by encoding predicted expressions in the same format as embedding vectors of a codebook of autoencoder module 140 (e.g., codebook 246 of FIG. 2).

In some examples, autoencoder module 140 may include a first encoder (e.g., expression encoder 543 of FIG. 5) and a second encoder (e.g., lip sync encoder 544 of FIG. 5). Encoder module 542 may be trained by at least adjusting parameters of a neural network of encoder module 542 based on a commitment loss value. Encoder module 542 may be trained by at least generating a training encoding vector by providing a training expression (e.g., from training expressions 532) to the first encoder and providing a training reference (e.g., from training references 536) and a training audio waveform (e.g., an audio waveform from training audio-visual media 534) to the second encoder. Autoencoder 540 may determine a training embedding vector of a codebook (e.g., codebook 546) based on the training encoding vector. Autoencoder 540 may determine, based on the training embedding vector, a learning expression with decoder module 548. Autoencoder 540 may determine a reconstruction loss value based on the learning expression. Autoencoder 540 may adjust a first set of parameters of a first neural network of encoder module 542 and a second set of parameters of a second neural network of decoder module 548 based on the reconstruction loss value.

Computing system 130 may determine, based on the encoding vector, an embedding vector of a plurality of embedding vectors of a codebook of the machine learning system (704). For example, computing system 130 may map the encoding vector to an embedding space (e.g., embedding space 447 of FIG. 4) of the codebook (e.g., codebook 446 of FIG. 4). Computing system 130 may determine the embedding vector as the embedding vector that is nearest to the encoding vector when mapped to the embedding space of the codebook. In some instances, computing system 130 may learn the embedding vectors by at least determining a codebook alignment loss value based on one or more training encoding vectors and training embedding vectors. Computing system 130 may adjust the embedding vectors in the embedding space of the codebook based on the determined codebook alignment loss value.

Computing system 130 may provide the embedding vector to a decoder module of the machine learning system (706). For example, computing system 130 may provide the embedding vector to decoder module 548 of FIG. 5. Decoder module 548 may be trained to decode the determined embedding vector as an expression specifying a series of lip geometries. Decoder module 548 may be trained to decode the embedding vector based on a reconstruction loss value determined during the training phase.

Computing system 130 may output, based on the embedding vector, an expression with the decoder module (708). For example, decoder module 548 of FIG. 5 may be trained to output an expression as a series of lip geometries. Decoder module 548 may be trained to output the expression by decoding the determined embedding vector and implementing identified facial characteristics based on being trained with identity parameters associated with training references 536. In some instances, decoder module 548 may generate a raw expression based on the determined embedding vector. Decoder module 548 may provide the raw expression to scale module 550. Scale module 550 may output a final expression based on a scaling factor determined based on parameters of encoder module 542, codebook 546, and decoder module 548. In some examples, decoder module 548 and/or scale module 550 may provide expressions to and one or more original image frames (e.g., original image frames from audio-visual media 111 with timestamps specifying when one or more original image frames correspond to input audio waveforms of audio 112) to a generative machine learning model (e.g., face generative model 670). Face generative model 670 may output a series of altered image frames based on the expressions and the original image frames. Face generative model 670 may generate an altered version of an original audio-visual media piece to include the altered image frames, as well as the original audio waveform (e.g., audio 112).

Example 1: A method includes generating, by a computing system, an encoding vector by providing an audio waveform to an encoder module; determining, by the computing system and based on the encoding vector, an embedding vector of a plurality of embedding vectors of a codebook; providing, by the computing system, the embedding vector to a decoder module; and outputting, by the computing system and based on the embedding vector, an expression with the decoder module, wherein the expression includes a series of one or more lip geometries.

Example 2: The method of example 1, wherein determining the embedding vector comprises: mapping the encoding vector to an embedding space of the codebook; and determining the embedding vector is nearest to the encoding vector when mapped to the embedding space of the codebook.

Example 3: The method of any of examples 1 and 2, further includes providing the expression and one or more original image frames to a generative machine learning model, wherein the one or more original image frames and the audio waveform correspond to a time in an audio-visual media piece; and outputting, by the generative machine learning model, one or more altered image frames based on the expression and the one or more original image frames.

Example 4: The method of any of examples 1 through 3, wherein the expression comprises the series of one or more lip geometries and a reference of a plurality of references, and the method further includes providing expression parameters to a first neural network of a first encoder of the encoder module, wherein the expression parameters are associated with the series of one or more lip geometries; and providing identity parameters to a second neural network of a second encoder of the encoder module and a third neural network of the decoder module, wherein the identity parameters are associated with the plurality of references.

Example 5: The method of any of examples 1 through 4, wherein the encoder module comprises a first encoder and a second encoder, and the method further includes generating a training encoding vector by providing a training expression to the first encoder and providing a training reference and a training audio waveform to the second encoder; determining a training embedding vector of the codebook based on the training encoding vector; determining, based on the training embedding vector, a learning expression with the decoder module; determining a reconstruction loss value based on the learning expression; and adjusting a first set of parameters of a first neural network of the encoder module and a second set of parameters of a second neural network of the decoder module based on the reconstruction loss value.

Example 6: The method of any of examples 1 through 5, further includes determining a codebook alignment loss value based on one or more training encoding vectors and a plurality of training embedding vectors; and adjusting the plurality of embedding vectors in an embedding space of the codebook based on the codebook alignment loss value.

Example 7: The method of any of examples 1 through 6, further includes determining a commitment loss value based on the plurality of embedding vectors; and adjusting parameters of a neural network of the encoder module based on the commitment loss value.

Example 8: The method of any of examples 1 through 7, wherein the expression is a raw expression, and wherein the method further comprises: providing parameters of the encoder module, the codebook, and the decoder module to a scale module; determining, based on the parameters, a scaling factor with the scale module; and outputting a final expression based on the scaling factor.

Example 9: A computing system includes at least one processor; and a storage device that stores instructions executable by the at least one processor to: generate an encoding vector by providing an audio waveform to an encoder module, determine, based on the encoding vector, an embedding vector of a plurality of embedding vectors of a codebook, provide the embedding vector to a decoder module, and output, based on the embedding vector, an expression with the decoder module, wherein the expression includes a series of one or more lip geometries.

Example 10: The computing system of any of example 9, wherein to determine the embedding vector, the instructions executable by the at least one processor cause the at least one processor to: map the encoding vector to an embedding space of the codebook, and determine the embedding vector is nearest to the encoding vector when mapped to an embedding space of the codebook.

Example 11: The computing system of any of examples 9 and 10, wherein the instructions executable by the at least one processor further cause the at least one processor to: provide the expression and one or more original image frames to a generative machine learning model, wherein the one or more original image frames and the audio waveform correspond to a time in an audio-visual media piece; and output, by the generative machine learning model, one or more altered image frames based on the expression and the one or more original image frames.

Example 12: The computing system of any of examples 9 through 11, wherein the expression comprises the series of one or more lip geometries and a reference of a plurality of references, and wherein the instructions executable by the at least one processor further cause the at least one processor to: provide expression parameters to a first neural network of a first encoder of the encoder module, wherein the expression parameters are associated with the series of one or more lip geometries, and provide identity parameters to a second neural network of a second encoder of the encoder module and a third neural network of the decoder module, wherein the identity parameters are associated with the plurality of references.

Example 13: The computing system of any of examples 9 through 12, wherein the encoder module comprises a first encoder and a second encoder, and wherein to train the encoder module and the decoder module the instructions executable by the at least one processor further cause the at least one processor to: generate a training encoding vector by providing a training expression to the first encoder and providing a training reference and a training audio waveform to the second encoder, determine a training embedding vector of the codebook based on the training encoding vector, determine, based on the training embedding vector, a raw expression with the decoder module, determine a reconstruction loss value based on the raw expression, and adjust a first set of parameters of a first neural network of the encoder module and a second set of parameters of a second neural network of the decoder module based on the reconstruction loss value.

Example 14: The computing system of any of examples 9 through 13, wherein to learn the plurality of embedding vectors, the instructions executable by the at least one processor cause the at least one processor to: determine a codebook alignment loss value based on one or more training encoding vectors and the plurality of embedding vectors, and adjust the plurality of embedding vectors in an embedding space of the codebook based on the codebook alignment loss value.

Example 15: The computing system of any of examples 9 through 14, wherein to train the encoder module, the instructions executable by the at least one processor cause the at least one processor to: determine a commitment loss value based on the plurality of embedding vectors, and adjust parameters of a neural network of the encoder module based on the commitment loss value.

Example 16: The computing system of any of examples 9 through 15, wherein the expression is a raw expression, and wherein the instructions executable by the at least one processor further cause the at least one processor to: provide parameters of the encoder module, the codebook, and the decoder module to a scale module, determine, based on the parameters, a scaling factor with the scale module, and output a final expression based on the scaling factor.

Example 17: Non-transitory computer-readable storage medium configured to store instructions that, when executed, cause one or more processors of a computing system to: generate an encoding vector by providing an audio waveform to an encoder module, determine, based on the encoding vector, an embedding vector of a plurality of embedding vectors of a codebook, provide the embedding vector to a decoder module, and output, based on the embedding vector, an expression with the decoder module, wherein the expression includes a series of one or more lip geometries.

Example 18: The non-transitory computer-readable storage medium of example 17, wherein to determine the embedding vector, the instructions cause the one or more processors to: map the encoding vector to an embedding space of the codebook, and determine the embedding vector is nearest to the encoding vector when mapped to an embedding space of the codebook.

Example 19: The non-transitory computer-readable storage medium of any of examples 17 and 18, wherein the instructions further cause the one or more processors to: provide the expression and one or more original image frames to a generative machine learning model, wherein the one or more original image frames and the audio waveform correspond to a time in an audio-visual media piece; and output, by the generative machine learning model, one or more altered image frames based on the expression and the one or more original image frames.

Example 20: The non-transitory computer-readable storage medium of any of examples 17 through 19, wherein the expression comprises the series of one or more lip geometries and a reference of a plurality of references, and wherein the instructions further cause the one or more processors to: provide expression parameters to a first neural network of a first encoder of the encoder module, wherein the expression parameters are associated with the series of one or more lip geometries, and provide identity parameters to a second neural network of a second encoder of the encoder module and a third neural network of the decoder module, wherein the identity parameters are associated with the plurality of references.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage mediums and media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of a computer-readable medium.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

Various examples of the invention have been described. These and other examples are within the scope of the following claims.

What is claimed is:

1. A method comprising:
    generating, by a computing system, an encoding vector by providing an audio waveform to an encoder module;
    determining, by the computing system and based on the encoding vector, an embedding vector of a plurality of embedding vectors of a codebook, wherein the codebook includes a multi-modal embedding space with the plurality of embedding vectors, each embedding vector of the plurality of embedding vectors representing discrete combinations of audio, expressions, and reference facial geometries;
    providing, by the computing system, the embedding vector to a decoder module; and
    outputting, by the computing system and based on the embedding vector, an expression with the decoder module, wherein the expression includes a series of one or more lip geometries.

2. The method of claim 1, wherein determining the embedding vector comprises:
    mapping the encoding vector to the multi-modal embedding space of the codebook; and
    determining the embedding vector is nearest to the encoding vector when mapped to the multi-modal embedding space of the codebook.

3. The method of claim 1, further comprising:
    providing the expression and one or more original image frames to a generative machine learning model, wherein the one or more original image frames and the audio waveform correspond to a time in an audio-visual media piece; and
    outputting, by the generative machine learning model, one or more altered image frames based on the expression and the one or more original image frames.

4. The method of claim 1, wherein the expression comprises the series of one or more lip geometries and a reference of a plurality of references, and the method further comprising:
    providing expression parameters to a first neural network of a first encoder of the encoder module, wherein the expression parameters are associated with the series of one or more lip geometries; and
    providing identity parameters to a second neural network of a second encoder of the encoder module and a third neural network of the decoder module, wherein the identity parameters are associated with the plurality of references.

5. The method of claim 1, wherein the encoder module comprises a first encoder and a second encoder, and the method further comprising training the encoder module and the decoder module by at least:
    generating a training encoding vector by providing a training expression to the first encoder and providing a training reference and a training audio waveform to the second encoder;
    determining a training embedding vector of the codebook based on the training encoding vector;
    determining, based on the training embedding vector, a learning expression with the decoder module;

determining a reconstruction loss value based on the learning expression; and adjusting a first set of parameters of a first neural network of the encoder module and a second set of parameters of a second neural network of the decoder module based on the reconstruction loss value.

6. The method of claim 1, further comprising learning the plurality of embedding vectors by at least:

determining a codebook alignment loss value based on one or more training encoding vectors and a plurality of training embedding vectors; and adjusting the plurality of embedding vectors in the multi-modal embedding space of the codebook based on the codebook alignment loss value.

7. The method of claim 1, further comprising training the encoder module by at least:

determining a commitment loss value based on the plurality of embedding vectors; and adjusting parameters of a neural network of the encoder module based on the commitment loss value.

8. The method of claim 1, wherein the expression is a raw expression, and wherein the method further comprises:

providing parameters of the encoder module, the codebook, and the decoder module to a scale module;

determining, based on the parameters, a scaling factor with the scale module; and outputting a final expression based on the scaling factor.

9. A computing system comprising:

at least one processor; and a storage device that stores instructions executable by the at least one processor to:

generate an encoding vector by providing an audio waveform to an encoder module, determine, based on the encoding vector, an embedding vector of a plurality of embedding vectors of a codebook, wherein the codebook includes a multi-modal embedding space with the plurality of embedding vectors, each embedding vector of the plurality of embedding vectors representing discrete combinations of audio, expressions, and reference facial geometries, provide the embedding vector to a decoder module, and output, based on the embedding vector, an expression with the decoder module, wherein the expression includes a series of one or more lip geometries.

10. The computing system of any of claim 9, wherein to determine the embedding vector, the instructions executable by the at least one processor cause the at least one processor to:

map the encoding vector to the multi-modal embedding space of the codebook, and determine the embedding vector is nearest to the encoding vector when mapped to the multi-modal embedding space of the codebook.

11. The computing system of claim 9, wherein the instructions executable by the at least one processor further cause the at least one processor to:

provide the expression and one or more original image frames to a generative machine learning model, wherein the one or more original image frames and the audio waveform correspond to a time in an audio-visual media piece; and output, by the generative machine learning model, one or more altered image frames based on the expression and the one or more original image frames.

12. The computing system of claim 9, wherein the expression comprises the series of one or more lip geometries and a reference of a plurality of references, and wherein the instructions executable by the at least one processor further cause the at least one processor to:

provide expression parameters to a first neural network of a first encoder of the encoder module, wherein the expression parameters are associated with the series of one or more lip geometries, and provide identity parameters to a second neural network of a second encoder of the encoder module and a third neural network of the decoder module, wherein the identity parameters are associated with the plurality of references.

13. The computing system of claim 9, wherein the encoder module comprises a first encoder and a second encoder, and wherein to train the encoder module and the decoder module the instructions executable by the at least one processor further cause the at least one processor to:

generate a training encoding vector by providing a training expression to the first encoder and providing a training reference and a training audio waveform to the second encoder, determine a training embedding vector of the codebook based on the training encoding vector, determine, based on the training embedding vector, a raw expression with the decoder module, determine a reconstruction loss value based on the raw expression, and adjust a first set of parameters of a first neural network of the encoder module and a second set of parameters of a second neural network of the decoder module based on the reconstruction loss value.

14. The computing system of claim 9, wherein to learn the plurality of embedding vectors, the instructions executable by the at least one processor cause the at least one processor to:

determine a codebook alignment loss value based on one or more training encoding vectors and the plurality of embedding vectors, and adjust the plurality of embedding vectors in the multi-modal embedding space of the codebook based on the codebook alignment loss value.

15. The computing system of claim 9, wherein to train the encoder module, the instructions executable by the at least one processor cause the at least one processor to:

determine a commitment loss value based on the plurality of embedding vectors, and adjust parameters of a neural network of the encoder module based on the commitment loss value.

16. The computing system of claim 9, wherein the expression is a raw expression, and wherein the instructions executable by the at least one processor further cause the at least one processor to:

provide parameters of the encoder module, the codebook, and the decoder module to a scale module, determine, based on the parameters, a scaling factor with the scale module, and output a final expression based on the scaling factor.

17. Non-transitory computer-readable storage medium configured to store instructions that, when executed, cause one or more processors of a computing system to:

generate an encoding vector by providing an audio waveform to an encoder module, determine, based on the encoding vector, an embedding vector of a plurality of embedding vectors of a codebook, wherein the codebook includes a multi-modal embedding space with the plurality of embedding vectors, each embedding vector of the plurality of embedding vectors representing discrete combinations of audio, expressions, and reference facial geometries, provide the embedding vector to a decoder module, and output, based on the embedding vector, an expression with the decoder module, wherein the expression includes a series of one or more lip geometries.

18. The non-transitory computer-readable storage medium of claim 17, wherein to determine the embedding vector, the instructions cause the one or more processors to:

map the encoding vector to the multi-modal embedding space of the codebook, and determine the embedding vector is nearest to the encoding vector when mapped to the multi-modal embedding space of the codebook.

19. The non-transitory computer-readable storage medium of claim 17, wherein the instructions further cause the one or more processors to:

provide the expression and one or more original image frames to a generative machine learning model, wherein the one or more original image frames and the audio waveform correspond to a time in an audio-visual media piece; and output, by the generative machine learning model, one or more altered image frames based on the expression and the one or more original image frames.

20. The non-transitory computer-readable storage medium of claim 17, wherein the expression comprises the series of one or more lip geometries and a reference of a plurality of references, and wherein the instructions further cause the one or more processors to:

provide expression parameters to a first neural network of a first encoder of the encoder module, wherein the expression parameters are associated with the series of one or more lip geometries, and provide identity parameters to a second neural network of a second encoder of the encoder module and a third neural network of the decoder module, wherein the identity parameters are associated with the plurality of references.

* * * * *